United States Patent [19]

Imataki et al.

[11] Patent Number: 4,876,042
[45] Date of Patent: Oct. 24, 1989

[54] MOLDING PROCESSING USING A REPRODUCIBLE MOLDING DIE

[75] Inventors: Hiroyuki Imataki; Mizuho Hiraoka, both of Kawasaki; Tomoyuki Tamura, Yokohama; Tetsuya Satoh, Kawasaki, all of Japan

[73] Assignee: Canon Kabushiki Kaisha, Tokyo, Japan

[21] Appl. No.: 288,456

[22] Filed: Dec. 22, 1988

[30] Foreign Application Priority Data

Dec. 28, 1987 [JP] Japan ................................. 62-334993
Dec. 29, 1987 [JP] Japan ................................. 62-336066

[51] Int. Cl.4 ............................................. B29C 43/36
[52] U.S. Cl. ...................................... 264/39; 264/1.3; 264/106; 264/107; 264/219; 427/155; 427/156
[58] Field of Search .................. 264/1.3, 39, 106, 107, 264/219; 427/155, 156

[56] References Cited

U.S. PATENT DOCUMENTS 4,297,312 10/1981 Carroll et al. ........................ 264/219
4,408,319 10/1983 Tsunoda et al. ..................... 264/106
4,482,511 11/1984 Komatsubara ....................... 264/1.3

Primary Examiner—Jan H. Silbaugh
Assistant Examiner—Nick Krisch
Attorney, Agent, or Firm—Fitzpatrick, Cella, Harper & Scinto

[57] ABSTRACT

A reproducible molding die including a base structure having an unevenness pattern, and a cleaning layer disposed on the surface of the base structure having the unevenness pattern, wherein the cleaning layer is removable while substantially retaining the unevenness pattern of the base structure. By using above-mentioned molding die, a possible molding residue left in a molding step can easily be removed together with the cleaning layer.

6 Claims, 2 Drawing Sheets

MOLDING PROCESSING USING A REPRODUCIBLE MOLDING DIE

FIELD OF THE INVENTION AND RELATED ART

The present invention relates to a reproducible molding die, and a molding process using the same.

In the substrate for an optical recording medium, unevenness such as guide groove or pit is formed on the information recording surface thereof. In order to form such substrate, when the substrate comprises a thermoplastic resin, there have been used an injection molding process or a hot pressing process wherein the guide groove or negative is transferred to the substrate, or a so-called 2P process. In the 2P process, a photo-curable (or photohardenable) resin composition is applied onto a transparent resin plate comprising a thermosetting resin or thermoplastic resin, the resultant substrate is caused to contact a stamper (or die), and radiation rays such as ultraviolet rays and X rays are uniformly supplied thereto from the transparent resin plate side to cure the above-mentioned resin composition, whereby the pattern of the stamper is transferred to the transparent resin plate.

However, in the thermoplastic resin substrate obtained by the above-mentioned injection molding process or hot pressing process, residual stress or molecular orientation due to heat history causes warp or optical anisotropy in the substrate after the formation, whereby the resultant substrate for optical recording medium can cause some problems. Further, in the substrate obtained by the 2P process, unreacted polymerization initiator and monomer are liable to remain, and they often affect the optical recording layer of an optical recording medium.

On the other hand, the casting or cast molding process has been known as a process for producing an optical recording medium substrate which is free of the above-mentioned problem.

In the conventional cast molding process for producing an optical recording medium substrate, a preformat pattern such as guide groove and pit is formed on a substrate such as a glass plate and metal plate in an unevenness form to obtain a cast molding die (or molding die for casting). Opposite to the cast molding die, a smooth glass plate as a mirror die is disposed by the medium of a spacer to obtain a device for cast molding. Then, a monomer for resin, or prepolymer containing a solvent, etc., is poured into the device and then cured to obtain an optical recording medium substrate. In the thus obtained optical recording medium substrate, the above-mentioned optical anisotropy or warp does not occur because substantially no pressure is applied to the product at the time of molding, as compared with the above-mentioned injection molding process, hot pressing process or 2P process. Further, the resultant recording layer is not affected unlike that obtained by the 2P process.

However, in the cast molding process, the durability of the molding die is problematic. More specifically, even when a die material excellent in releasability, or a surface-treated die as described in Japanese Laid-Open Patent Application (JP-A, KOKAI) No. 149116/1988 is used for the molding die, the die can show the excellent releasability at the initial stage, but the die is contaminated to a non-negligible extent when the molding process is repeated about 20 to 50 times, whereby the pre-format signal is impaired.

Accordingly, it is necessary to wash or clean the die. However, it is very difficult to completely return the mold to the initial state, and therefore non-removable tailings, or contamination in the form of a blot remains.

Such contamination of the die is also transferred to a molded product as a defect and impairs the pre-format signal. As a result, there occurs a problem that the reliability of the resultant information recording medium decreases.

SUMMARY OF THE INVENTION

The present invention has been made in order to solve the above-mentioned problems encountered in the prior art, and a principal object of the present invention is to provide a reproducible molding die which can be reused by completely and easily removing contamination attached thereto, and a molding process using the molding die.

According to the present invention, there is provided a reproducible molding die comprising: a base structure having an unevenness pattern, and a cleaning layer disposed on the surface of the base structure having the unevenness pattern, wherein the cleaning layer is removable while substantially retaining the unevenness pattern of the base structure.

The present invention also provides a molding process, comprising:

providing a reproducible molding die comprising base structure having an unevenness pattern, and a cleaning layer disposed on the surface of the base structure having the unevenness pattern;

molding a product by means of the molding die, while leaving a possible molding residue on the molding die; and removing the cleaning layer together with the residue on the molding die while substantially retaining the unevenness pattern of the base structure.

In the present invention, the above-mentioned removable cleaning layer is disposed on the mold surface of the molding die. Accordingly, when a residue produced in a molding step is attached to the mold surface to contaminate it, the mold surface can easily be returned to the initial state by removing the residue together with the cleaning layer. As a result, according to the present invention, the durability of the mold can be improved.

Further, in the present invention, the mold can be reused by again disposing a cleaning layer on the mold surface from which the above-mentioned cleaning layer has been removed.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
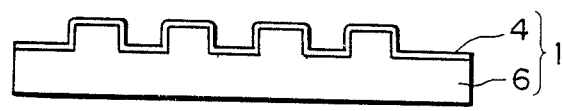
FIGS. 1, 2 and 4 are schematic sectional views each showing an embodiment of the molding die according to the present invention.
Figure 2:
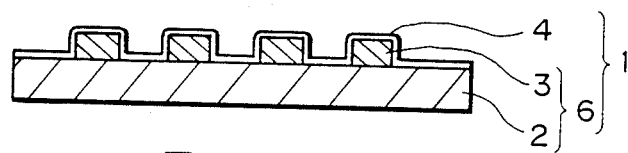

FIGS. 1 and 2 respectively illustrate embodiments of the reproducible molding die according to the present invention. FIG. 1 shows an embodiment of the molding die 1 wherein a cleaning layer 4 is disposed on a base molding die 6 on which an unevenness pattern has been formed by directly etching a substrate.

FIG. 2 shows an embodiment of the molding die 1 wherein a cleaning layer 4 is disposed on a base molding die 6 comprising a substrate 2 and a pattern 3. In this embodiment, the pattern 3 is formed by disposing a metal film of, e.g., chromium, and then patternwise etching the resultant metal film.

In the present invention, the cleaning layer 4 can be removed while substantially retaining the unevenness pattern of the base molding die 6. More specifically, in the present invention, when the cleaning layer 4 is removed from the molding die 6, e.g., by etching, under a condition such that a 3000 Å-thick cleaning layer may completely be removed, the pattern on the surface of the base molding die 6 (or a protective layer 5 appearing hereinafter) is not substantially affected or eroded even when the surface of the base molding die 6 is observed through an optical microscope (magnification: 400).

For example, when a 3000 Å-thick Cr cleaning layer 4 is completely removed from the molding die 1 by dipping it in an etching liquid for 90 sec, the pattern of the base molding die 6 is not substantially eroded even when the surface of the base molding die 6 is observed through an optical microscope (magnification: 400).

The cleaning layer 4 may preferably be one which shows good adhesion to the mold surface of the base molding die 6, is capable of covering the base molding die faithfully corresponding to the shape of the mold surface (i.e., capable of substantially retaining the unevenness pattern of the base molding die 6), and can easily be removed at the time of reproducing the molding die 1. Specific examples of such preferred cleaning layer may include: a film of metal such as chromium, aluminum, titanium, and cobalt; a film of dielectric material including inorganic oxides such as SiO, SiO$_2$, Al$_2$O$_3$ and ZrO$_2$; a thin film of an organic material such as acrylic resins, olefinic resins and epoxy resins. However, the cleaning layer 4 used in the present invention is not restricted to these specific materials.

The cleaning layer 4 may preferably have a thickness of ordinarily 10 microns or below, more preferably 0.3–5 microns, while somewhat depending on the material therefor.

In order to form the cleaning layer 4 on the base molding die 6, there may be used vapor deposition processes such as vacuum evaporation, sputtering, and plasma polymerization; application methods such as spraying, dipping, roller coating and spin coating. Among these, the vacuum evaporation method or sputtering method is particularly preferred because the resultant cleaning layer has good adaptability to an unevenness pattern.

On the other hand, the base molding die 6 may be one obtained by directly etching the surface of a bulk material such as glass or chromium to form an unevenness; or one obtained by forming a thin layer of chromium, TiN, etc., on a substrate and then forming an unevenness pattern thereof; etc. Particularly, the latter base molding die wherein convexities of the pattern comprise a material different from that of the substrate is most suitable for formation of a minute unevenness pattern for information recording medium, because such base molding die is excellent in precision of the pattern and depth uniformity with respect to concavities of the unevenness pattern.

Figure 5:
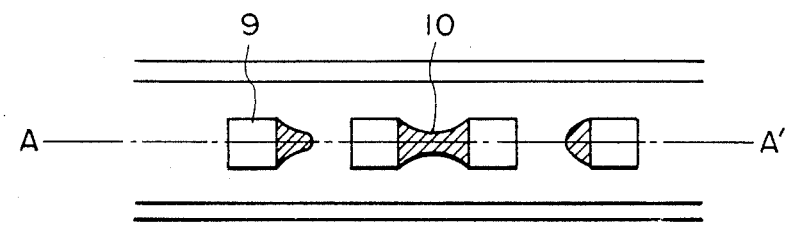
FIG. 5 is a schematic plan view showing a defect caused in the periphery of the transferred unevenness pattern of a molded product which has been produced by using a conventional molding die.
Figure 6:
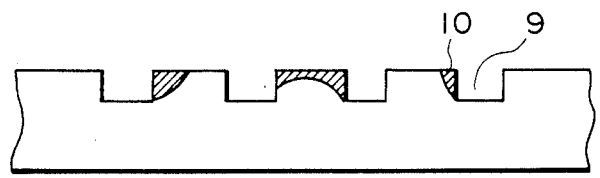
FIG. 6 shows a schematic sectional view showing a cross section of the molded product shown in FIG. 5 taken on the line represneted by A—A' in FIG. 5.

When the cleaning layer 4 is disposed on such base molding die 6 to prepare, e.g., a molding die for casting, the contact surface of the resultant molding die with a poured liquid resin comprises a surface of the same material, and the stress applied between the cured resin and the molding die at the time of release can be constant along the interface therebetween. As a result, a lack or crack, as shown in FIG. 5 or 6, in the periphery of the unevenness pattern which has been transferred to the molded product can also be prevented effectively.

Hereinbelow, there will be described an embodiment of the process for producing the above-mentioned molding die with reference to FIGS. 3A–3D.

Figure 3A:
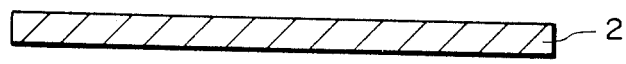
FIGS. 3A to 3B are schematic views illustrating a process for producing the molding die according to the present invention.
Figure 3B:
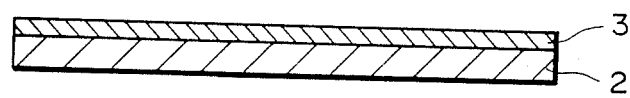

Referring to FIGS. 3A and 3B, a thin layer 3 for forming a pattern is first formed on a substrate 2. As the material for the substrate 2, there may be used those having a strength corresponding to the durability required for a molding die for casting. Within such scope, the substrate material may preferably be as light as possible. Specific examples of such material include glass, super hard alloys, or hardening product of steel for die, etc. Incidentally, the substrate 2 may preferably be used after it is subjected to mirror polishing and washing.

On the other hand, the material for the thin layer 3 may preferably be one which is different from that for the substrate 2. The material for the thin layer 3 may preferably be selected from those which are capable of providing durability required for a cast molding die, similarly as in the case of the substrate 2, and can easily be formed into a thin layer. Specific examples of the thin layer 3 material may include chromium, alloys of gold and chromium, SiO, SiO$_2$, etc. Further, with respect to the combination of the substrate 2 and the thin layer 3, it is preferred to use an inorganic dielectric substance for the substrate 2, and a metal for the thin layer 3. It is particularly preferred to use glass for the substrate 2, and chromium for the thin layer 3.

Then, a thin layer for photoresist (not shown) is formed on the upper surface of the thin layer 3, and the photoresist layer is exposed to light, etc., through the medium of a mask corresponding a preformat pattern, and then developed to remove, e.g., the exposed portion of the photoresist.

The photoresist used herein may be one which has been used when the master negative for an optical disk, and may be an ordinary positive-type or negative-type photoresist. The method of forming the photoresist thin layer is not particularly limited, but may preferably be a spinning coating method. The photoresist layer may preferably have a thickness of 500–1500 Å. If the thickness is below 500 Å, it is difficult to form a coating film having a uniform thickness by the spinning method, etc., and a defect of the coating film such as a pin hole is liable to occur.

Figure 3C:
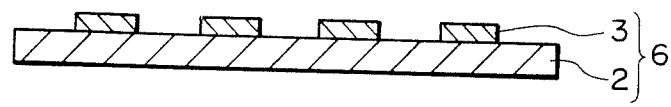

After the development, the thin layer 3 disposed on the substrate 2 is subjected to etching. In this step, it is preferred that the whole thickness of the thin layer 3 is etched to completely bare the predetermined portion of the surface of the substrate 2. Then, the residual photoresist is removed to obtain a base molding die 6 on which an unevenness pattern 3 has been formed as shown in FIG. 3C.

Figure 3D:
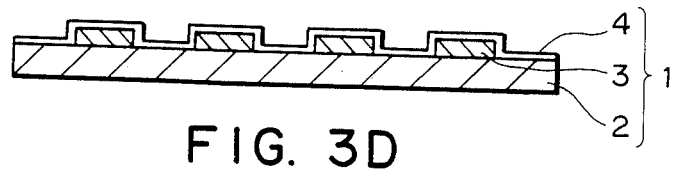

Then, a cleaning layer 4 is formed on the unevenness pattern 3 of the base molding die 6 by using the above-mentioned material and method, as shown in FIG. 3D.

In the present invention, the unevenness pattern comprises, e.g., one corresponding to a tracking groove or an information pit to be formed in the substrate for an information recording medium. The present invention is particularly suitable when a spiral tracking groove for an optical disk preferably having a width of 0.2–3.0 micron more preferably 0.5–2 micron (particularly about 0.6 micron), and a pitch of 0.1–15.0 micron, more preferably 1.0–5 micron (particularly, about 1.6 micron); or parallel tracking grooves for an optical card preferably having a width of 1–10 micron, more preferably 2–5 microns (particularly, about 3 microns), and a pitch of 5–20 microns, more preferably 8–15 micron (particularly, about 12 micron); or minute information pits each in the form of a rectangle having a length of 10 microns or below and a width of 10 microns or below, or those in the form of an ellipse having a major axis of 10 microns or below are formed on a substrate for an information recording medium.

Further, the present invention is particularly suitable when there is formed on the substrate an unevenness pattern such that a lack, etc., of the above-mentioned minute pits or grooves impairs stable recording or reproduction of information with respect to an information recording medium.

Figure 4:
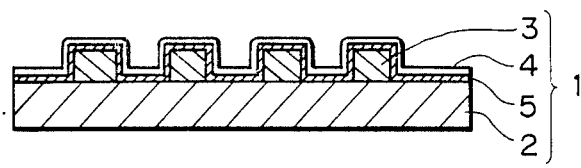

In the present invention, it is possible to dispose a protective layer 5 between the mold surface of the base molding die, and the cleaning layer 4, as shown in FIG. 4. FIG. 4 shows an embodiment wherein a protective layer 5 is formed on a base molding die which is the same as that in FIG. 2, and a cleaning layer 4 is formed on the protective layer 5. When such protective layer 5 is disposed, the die material can completely be protected from an etchant which is used for removing the cleaning layer 5.

The protective layer 5 may preferably be one which cannot be removed by the etchant. Specific example of the material therefor include, e.g., inorganic oxides such as SiO, SiO$_2$ and Al$_2$O$_3$; inorganic nitrides such as Si$_3$N$_4$, TiN and AlN; carbides such as ZrC, SiC and TiC; organic compounds; etc., while they somewhat varies depending on the material for the cleaning layer 4 formed in combination therewith.

In order to form the protective layer 5, there may be used vapor deposition processes such as vacuum evaporation, sputtering, and plasma polymerization; application methods such as roller coating and spin coating. Among these, the vacuum vapor deposition process such as the vacuum evaporation method, sputtering method or plasma polymerization method, is particularly preferred because the resultant protective layer 5 has good adaptability to the molding die, similarly as in the case of the cleaning layer.

Incidentally, the molding die according to the present invention can be used not only in the casting process but also in the compression molding process and injection molding process.

In order to reproduce or regenerate the molding die 1 having a cleaning layer 4 according to the present invention, the cleaning layer 4 disposed at the mold surface of the molding die 1 may easily be removed by an etchant such as an acid, a base or a solvent.

Preferred examples of the etchant may include: a solution comprising cerium nitrate, perchloric acid and water (e.g., 17:5:20) or a solution comprising potassium ferricyanide, potassium hydroxide and water (e.g., 3:2:8) in the case of a cleaning layer of Cr; and a solution comprising hydrofluoric acid and ammonium fluoride (e.g., 1:7) in the case of a cleaning layer of SiO; etc.

In this removal step for the cleaning layer, it is preferred that the material for the die or convexities constituting the unevenness pattern, and that for the cleaning layer are appropriately be selected so that the mold surface disposed under the cleaning layer 4 is not etched together with the cleaning layer 4 or the shape of the unevenness pattern is not changed by the etching.

More specifically, with respect to preferred combination of these materials, when a metal is used as the die material, the cleaning layer 4 may preferably be comprise a thin layer of an inorganic oxide such as SiO, SiO$_2$, Al$_2$O$_3$ and ZrO$_2$ or an organic thin film. When glass is used as the die material, the cleaning layer 4 may preferably be a thin film of a metal such as Al, Cr, Ti and Co, or an organic thin film. Further, when the convexities of an unevenness pattern are formed on a glass substrate by using chromium, it is preferred that the above-mentioned protective layer 5 is formed by using an inorganic oxide such as SiO, SiO$_2$, Al$_2$O$_3$, or an inorganic nitride such as Si$_3$N$_4$, and TiN etc., and then there is formed thereon a cleaning layer 4 comprising a metal film of Al, Cr, Ti, Co, etc., or an organic thin film of an acrylic resin, an olefinic resin, an epoxy resin, etc., As described hereinabove, according to the present invention, there are provided a molding die usable for compression molding, casting, etc., wherein a removable cleaning layer is disposed on a base molding die; and a method of reproducing such molding die wherein contamination attached to the molding die is peeled therefrom together with the cleaning layer.

According to the present invention, the following effects are achieved:

(1) The die may easily be reproduced or regenerated.

(2) The die may easily be retained and may have an improved durability.

(3) The die can always be kept in the same state, thereby to provide a substrate having high reliability.

(4) There can be reduced a defect such as lack or crack to be produced in the periphery of an unevenness pattern which has been transferred to a molded product.

(5) The precision in unevenness pattern formed on a molded product may be improved.

Hereinbelow, the present invention will be explained more specifically with reference to Examples.

EXAMPLE 1

A 1 micron-thick TiN layer was formed on a substrate (15 cm × 15 cm) of a super hard alloy (trade name: Microalloy, mfd. by Toshiba Tungalloy K.K.) by sputtering, and the resultant product was subjected to dry etching thereby to prepare a base molding die for a compression die to be used for molding of information recording medium substrate.

Dry etching conditions:

Device: Reactive ion beam etching device (trade name: ECR 710E, mfd. by Anelva Co.)

Etching gas: CF$_4$

Degree of vacuum: 7 Pa

RF discharge power: 150 W

On the thus prepared based molding die, a 500 Å-thick chromium layer, as a cleaning layer was formed by vacuum evaporation to obtain a compression mold. By repeating the above-mentioned process, 100 sheets of compression molds were prepared.

By using the thus obtained compression mold, an acrylic resin substrate was subjected to compression molding under the conditions of a maximum temperature of 140° C. and a maximum pressure of 100 kgf/cm² to obtain an optical disk substrate having a diameter of 13 cm and having a spiral tracking groove (width of the tracking groove: 0.6 micron, piatch: 1.6 micron). When such molding process was repeated 180 times, the die began to be contaminated and the molding was stopped.

Then, the die was subjected to a reproduction process. In the reproduction process, the chromium of the cleaning layer was removed by etching using an etching liquid for chromium (ammonium cerium (IV) nitrate:perchloric acid:water=17:5:20) at room temperature for 15 sec, whereby the contamination attached onto the cleaning layer was also removed together therewith. As a result, the molding die was reproduced.

Then, a cleaning layer was again disposed on the unevenness pattern of the die in the above-mentioned manner. When the thus reproduced die was again subjected to a molding process as mentioned above, the unevenness pattern of the mold could precisely be transferred to an acrylic resin substrate.

The above-mentioned die could be used repeatedly by subjecting it to the above-mentioned cycle (molding-reproduction of the die-disposition of the cleaning layer). As a result, a life of the die of 5,000 times (number of shots) or more was obtained.

COMPARATIVE EXAMPLE 1

A molding die was prepared in the same manner as in Example 1 except that a cleaning layer was not formed. The method of washing the thus prepared die, was investigated in the following manner with respect to contamination attached thereto.

More specifically, the above-mentioned die was subjected to compression molding in the same manner as in Example 1 and the resultant contamination attached to the die was intended to be removed (1) by using a plasma-asher method, (2) by dipping it in a carbon-remover agent (Turco Curve NC, mfd. by Turco Co.), etc. However, non-removable particulate contamination remained even after the washing, and stain-like contamination could not be removed by any means. As the number of the repetition of the molding increased, the interval corresponding to the occurrences of contamination was shortened because the above-mentioned unremovable contamination functioned as nuclei. Further, the number of substrates wherein transfer failure due to the above-mentioned die contamination increased. As a result, the life of the die was below 2,000 times.

The molding dies obtained in Example 1 and Comparative Example 1 and the information recording medium substrates obtained by the molding process respectively using these dies were examined with the eye and an optical microscope (magnification: 400) to measure the probability of occurrence of defects such as lack. The thus obtained results are shown in Table 1 appearing hereinafter.

Each value shown in Table 1 is an average of probabilities of defect occurrence with respect to the respective substrates obtained from 100 sheets of the dies. The probability of defect occurrence was determined in the following manner.

The substrate having an unevenness pre-format pattern was prepared by using one die, and when one or more lack or crack occurred in the periphery of the unevenness pre-format pattern, the die was defined as a defective die. Based on such examination, the probability of defect occurrence was calculated according to the following formula:

$$\frac{\text{(number of defective substrates)}}{\text{(number of prepared substrates)}} \times 100\ (\%)$$

Further, the life of the die was defined as a time at which the probability of defect occurrence exceeded 80–90%.

TABLE 1

| Number of shots | Example 1 | Comparative Example 1 |
|---|---|---|
| 1–80 | 9% | 53% |
| 1981–2160 | 11% (11 reproductions) | 91% (11 washings) |
| 4861–5040 | 12% (27 reproductions) | — |

EXAMPLE 2

A 3000 Å-thick chromium layer was formed on a 2.3 mm-thick glass plate (13 cm × 13 cm) by vacuum evaporation and then the resultant product was subjected to patterning by a photolithographic process using a photoresist (AZ-1350, mfd. by Hoechst Japan K.K.) to obtain a base molding die for a casting die to be used for an optical card substrate. Then, on the thus obtained mold, an SiO film having a thickness of 2000–3000 Å was formed by vacuum evaporation as a protective layer, and then a 500 Å-thick chromium layer as a cleaning layer was formed on the protective layer by vacuum evaporation, thereby to obtain 100 sheets of casting dies.

Opposite to the thus obtained casting die, a 3 mm-thick glass plate with a mirror surface having the same size as the above-mentioned die was disposed by the medium of a spacer (thickness: 0.4 mm) to obtain a molding device for casting. Into the device, the following resin composition was poured, cured at 100° C. for 10 hours, and then released from the die.

| Resin Composition | |
|---|---|
| Methyl methacrylate | 70 wt. parts |
| Tertiary-butyl methacrylate | 25 wt. parts |
| Polyethylene glycol dimethacrylate (molecular weight: 620) | 5 wt. parts |

As a result, an optical card substrate having a size of 54 mm × 84 mm and an unevenness pattern. The thus obtained unevenness pattern had a 3 micron-wide tracking groove, a track pitch of 12 microns, and a depth of 3000 Å.

The above-mentioned molding cycle was repeated while the die was reproduced at intervals of 40 molding cycles causing noticeable contamination. The reproduction was effected by using the same etching liquid for chromium as that used in Example 1.

The above-mentioned die could be used repeatedly by subjecting it to the cycle of (disposition of a cleaning layer-molding-reproduction of the die). As a result, a life of the die of 1,000 times or more was obtained.

COMPARATIVE EXAMPLE 2

A casting die was prepared in the same manner as in Example 2 except that a cleaning layer was not formed. The thus prepared die was subjected to a casting molding process in the same manner as in Example 2 while the die was washed in the same manner as in Comparative Example 1 (i.e., by plasma-asher method and dipping in the carbon-remover) at intervals of 40 molding cycles causing noticeable contamination.

However, the contamination was not completely removed and the life of the die was about molding 500 cycles.

The molding dies obtained in Example 2 and Comparative Example 2 and the information recording medium substrates obtained by the molding process respectively using these dies were examined with the eye and an optical microscope to measure the probability of occurrence of defects such as lack. The thus obtained results are shown in Table 3 appearing hereinafter.

Each value shown in Table 3 is an average of probabilities of defect occurrence with respect to the respective substrates obtained from 100 sheets of the dies.

EXAMPLE 3

A chromium film having a thickness of 1000–3000 Å was formed n a substrate 1 of a 6 mm-thick glass plate with a mirror surface by vacuum evaporation. The thickness was determined in consideration of the concave depth in a predetermined unevenness pattern and the shrinkage ratio in a resin to be cured.

Then, the chromium film was subjected to patterning by a photolithographic process to obtain a base molding die for a casing die. Then, on the unevenness-patterned surface of the base molding die, a 1000 Å-thick Cr film as a protective layer was formed by vacuum evaporation, and then a 2500 Å-thick uniform SiO layer as a cleaning layer was formed on the protective layer by vacuum evaporation, thereby to obtain 100 sheets of casting dies.

Opposite to the thus obtained casting die, a 3 mm-thick glass plate with a mirror surface having the same size as the above-mentioned die was disposed by the medium of a spacer to obtain a molding device for casting. Into the device, a prepolymer for an acrylic resin to which a polymerization accelerator had been added was poured, cured at 100° C. for 10 hours, and then released from the mold. As a result, an optical card substrate having a size of 54 mm×84 mm and an unevenness pattern which had a 3 micron-wide tracking groove, a track pitch of 12 microns, and a depth of 3000 A.

The above-mentioned molding cycle was repeated while the die was reproduced by removing the cleaning layer at intervals of 40 molding cycles causing noticeable contamination. The reproduction was effected by using an etching liquid for SiO (hydrofluoric acid:ammonium fluoride=1:7) at room temperature for 2.5 min. to remove the die contamination.

Then, a 2500 Å-thick SiO layer was again formed on the unevenness pattern to reproduce the cast molding die, and subjected to the above-mentioned molding process. As a result, a life of the die of 1,000 cycles by repeating the above-mentioned cycle.

EXAMPLES 4 AND 5

100 sheets of cast molding dies were prepared in the same manner as in Example 3 except that a protective layer 5 and a cleaning layer 4 were formed on the surface of the base molding die used in Example 3 so as to form respective layers which comprised a material and had a thickness as shown in the following Table 2.

By using the thus prepared die, an optical card substrate having an unevenness pattern was formed in the same manner as in Example 3.

TABLE 2

|  | Protective layer | Cleaning layer |
| --- | --- | --- |
| Example 4 | Cr (1000Å) | SiO$_2$ (2000Å) |
| Example 5 | SiO (2000Å) | Cr (3500Å) |

The die of Example 4 was reproduced in the same manner as in Example 3, and the die of Example 5 was reproduced in the same manner as in Example 5. In both Examples, the life of the cast molding die was 1,000 cycles or more.

COMPARATIVE EXAMPLE 3

100 sheets of cast molding die were prepared in the same manner as in Example 3 except that a protective layer 5 and a cleaning layer 4 were not formed.

By using the thus prepared die, casting molding was conducted in the same manner as in Example 3, while the die was washed at intervals of 40 cycles. However, the contamination attached to the die was not completely removed but accumulated thereon, and peeling, etc., of the unevenness pattern also occurred. As a result, the life of the die was below 240 cycles.

The molding dies obtained in Examples 4 and 5 and Comparative Example 3 and the information recording medium substrates obtained by the molding process respectively using these dies (which were reproduced or washed) were examined with the eye and an optical microscope to measure the probability of occurrence of defects such as lack. The thus obtained results are shown in the following Table 3.

Each value shown in Table 3 is an average of probabilities of defect occurrence with respect to the respective substrates obtained from 100 sheets of the die.

The probability of defect occurrence in Table 3 is the same as that in the above Table 1.

TABLE 3

| | Example | | | | | |
| --- | --- | --- | --- | --- | --- | --- |
| Number of shots | Ex. 2 | Comp. Ex. 2 | Ex. 3 | Ex. 4 | Ex. 5 | Comp. Ex. 3 |
| 1–40 | 7% | 10% | 9% | 9% | 14% | 51% |
| 481–520 | 11% (12 reproductions) | 82% (12 washings) | 7% | 12% | 9% | * 91% |
| 961–1000 | 10% (26 reproductions) | — | 16% | 13% | 12% | — |
| 1001–1040 | 9% (27 reproductions) | — | 14% | 13% | 15% | — |

*: value corresponding to 201–240 shots

What is claimed is:
1. A molding process, comprising:
providing a reproducible molding die comprising a base structure having an evenness pattern, and a cleaning layer disposed on the surface of the base structure having said unevenness pattern;

molding a product by means of said molding die, while leaving molding residue on the molding die; and removing said cleaning layer together with the residue from the molding die while substantially retaining said unevenness pattern of the base structure.

2. A process according to claim 1, wherein a cleaning layer is again formed on the molding die from which said cleaning layer has been removed.

3. A process according to claim 1, wherein said cleaning layer is removed by an etchant.

4. A process according to claim 1, wherein a protective layer is disposed between said base structure and said cleaning layer.

5. A process according to claim 1, wherein said base structure comprises a substrate and convexities disposed thereon which constitute such unevenness pattern and comprise a material different from that of the substrate.

6. A process according to claim 5, wherein said substrate comprises glass and said convexities of the unevenness pattern comprise chromium.

* * * * *

UNITED STATES PATENT AND TRADEMARK OFFICE
CERTIFICATE OF CORRECTION

PATENT NO. : 4,876,042
DATED : October 24, 1989
INVENTOR(S) : HIROYUKI IMATAKI ET AL.

It is certified that error appears in the above-identified patent and that said Letters Patent is hereby corrected as shown below:

COLUMN 1

Line 17, "photohardenable)" should read
           --photo-hardenable)--.

COLUMN 2

Line 31, "base structure" should read --a base structure--.
    Line 64, "FIGS. 3A to 3B" should read --FIGS. 3A to 3D--.

COLUMN 3

Line 5, "represnetd" should read --represented--.

COLUMN 4

Line 52, "corresponding" should read --corresponding to--.

COLUMN 5

Line 15, "micron more" should read --micron, more--.
    Line 45, "example" should read --examples--.
    Line 50, "varies" should read --vary--.

COLUMN 6

Line 13, "be" should be deleted.
    Line 19, "be" should be deleted.

UNITED STATES PATENT AND TRADEMARK OFFICE
CERTIFICATE OF CORRECTION

PATENT NO. : 4,876,042

DATED : October 24, 1989

INVENTOR(S) : HIROYUKI IMATAKI ET AL.

It is certified that error appears in the above-identified patent and that said Letters Patent is hereby corrected as shown below:

COLUMN 7

Line 13, "piatch: 1.6 micron)." should read
--pitch: 1.6 micron).--.
Line 51, "repetition" should read --repetitions--.

COLUMN 8

Line 60, "pattern." should read --pattern is obtained.--.

COLUMN 9

Line 31, "formed n" should read --formed on--.
Line 56, "3000 A." should read --3000 Å was obtained.--.
Line 68, "cycle." should read --cycle was obtained.--.

COLUMN 10

Line 66, "evenness pattern," should read
--unevenness pattern,--.

COLUMN 11

Line 2, "molding residue" should read
--a molding residue--.

UNITED STATES PATENT AND TRADEMARK OFFICE
CERTIFICATE OF CORRECTION

PATENT NO. : 4,876,042
DATED : October 24, 1989
INVENTOR(S) : HIROYUKI IMATAKI ET AL.

It is certified that error appears in the above-identified patent and that said Letters Patent is hereby corrected as shown below:

COLUMN 12

Line 8, "such unevenness pattern" should read --said unevenness pattern--.

Signed and Sealed this

Third Day of March, 1992

Attest:

HARRY F. MANBECK, JR.

*Attesting Officer*     *Commissioner of Patents and Trademarks*